United States Patent

Schow et al.

[11] Patent Number: 6,000,173
[45] Date of Patent: Dec. 14, 1999

[54] HYDROPONIC GROWING STATION WITH INTERMITTENT NUTRIENT SUPPLY

[76] Inventors: Matthew Alan Schow, 141 7th Ave., San Francisco, Calif. 94118; Jason Lyndey Wynn, 26 Vendola St., San Rafael, Calif. 94901

[21] Appl. No.: 09/129,545

[22] Filed: Aug. 5, 1998

[51] Int. Cl.⁶ .................................................. A01G 31/00
[52] U.S. Cl. .................................. 47/62 R; 47/59; 47/60
[58] Field of Search ............................... 47/62 R, 62 A, 47/62 C, 62 E, 62 N, 17, 18, 59, 60

[56] References Cited

U.S. PATENT DOCUMENTS

| | | | |
|---|---|---|---|
| 4,075,785 | 2/1978 | Jones | 47/64 |
| 4,218,847 | 8/1980 | Leroux | 47/59 |
| 4,312,152 | 1/1982 | Drury et al. | 47/63 |
| 4,419,842 | 12/1983 | Paloian | 47/62 |
| 4,704,818 | 11/1987 | Cameron | 47/62 |
| 4,753,036 | 6/1988 | Konno | 47/59 |
| 4,850,134 | 7/1989 | Snekkenes | 47/18 |
| 4,869,019 | 9/1989 | Ehrlich | 47/62 R |
| 4,965,962 | 10/1990 | Akagi | 47/65 |
| 5,010,686 | 4/1991 | Rivest | 47/62 R |
| 5,168,664 | 12/1992 | Deutschmann | 47/79 |
| 5,252,108 | 10/1993 | Banks | 47/58 |
| 5,557,885 | 9/1996 | Sledge | 47/66 |
| 5,611,172 | 3/1997 | Dugan et al. | 47/1.01 |

FOREIGN PATENT DOCUMENTS

| | | | |
|---|---|---|---|
| 247527 | 12/1987 | European Pat. Off. | 47/62 A |
| 275712 | 7/1988 | European Pat. Off. | 47/62 |
| 65-068278 | 2/1970 | Japan | 47/62 C |
| 404053427 | 2/1992 | Japan | 47/62 A |
| 1531929 | 12/1989 | U.S.S.R. | 47/62 A |
| 1824111 | 6/1993 | U.S.S.R. | 47/62 A |
| WO 92015194 | 9/1992 | WIPO | 47/62 R |

OTHER PUBLICATIONS

Popular Science, "Modular Hydroponics", Elaine Smay, pp. 118–120, 168, May 1978.

The Grower, "Lettuce on Concrete", Allan Cooper, pp. 40–45, Feb. 1977.

Primary Examiner—Thomas Price
Assistant Examiner—Frederick T. French, III
Attorney, Agent, or Firm—Leland K. Jordan

[57] ABSTRACT

A hydroponic plant growth station having a growing board with a plurality of holes arranged in at least one vertical column of holes, a nutrient delivery channel disposed beneath the column of holes, and a supply of nutrient to the delivery channel.

4 Claims, 6 Drawing Sheets

HYDROPONIC GROWING STATION WITH INTERMITTENT NUTRIENT SUPPLY

FIELD OF THE INVENTION

This invention relates to hydroponic plant growing stations and in particular to growing stations with an improved nutrient delivery system and increased plant growth density.

BACKGROUND OF THE INVENTION

Indoor cultivation of fruits, vegetables, flowers and ornamental plants is an increasingly popular method of producing living plants, whether for the horticulturist, hobbyist or professional nursery operator. Hydroponic plant growth systems have been introduced which typically use an open-topped outer container for holding a liquid combination of water and plant growing nutrients and an open-topped inner container for holding an inert growing medium. Plant roots are grown in the medium. The inner container includes openings at its lower end to allow liquid to enter the growing medium and to drain from it. Automatic systems, generally requiring submersible pumps and hydraulic pumping systems, maintain the correct amount of growing nutrient. The inert growing medium typically includes clay pellets, sand, gravel, perlite, vermiculite, or the like. Alternately, in more complex and difficult to control aeroponic applications, plant roots are suspended in air and are fed constantly with a nutrient-rich mist.

During hydroponic growing, it is important that the delivery of the liquid nutrients to plant roots not exceed a maximum level, nor should the plant roots be deprived of nutrient and allowed to dry for too long a period of time. If over-watering occurs, the plant may die or have its growth inhibited from root rot. Allowing the roots of the plant to be dry for too long results in dehydration and starving the plant. Thus, an accurate method of delivering controlled amounts of liquid nutrient to the roots of a plant within a planter is desirable since it has been discovered that plant growth may be enhanced if periods of root saturation are followed by periods of root dryness.

Furthermore, to control the expenses of nutrient supply to plant roots and minimize the effort in re-cycling nutrient, it is advantageous to concentrate the nutrient delivery only within the area of root growth as opposed to spreading nutrient over a larger area encompassing areas not having root growth activity. Known nutrient supply systems do not have the commercial advantages of the combination of these provisions as provided by the present invention.

Hydroponic systems provided by the present invention may be used by commercial growers to control and deliver specific doses of moisture and nutrients so that herbs, in particular, have optimum flavor and consumer appeal. Hydroponically grown herbs, including basil, tarragon, arugula, mint, chilies, and the like, are therefore, excellent candidates as the commercial demand for such herbs is strong throughout the years, independent of growing season. However, since the taste of a plant is determined by the elements absorbed through its leaves and roots, it is desirable that such edible plants be produced in sheltered or enclosed environments free of pesticides, herbicides and artificial fertilizers. The expense of producing and maintaining a enclosed environment is impacted significantly by the space required within a hydroponic growing system. There is thus a further need for compact plant growth systems so that a relatively high plant growth density within a sheltered environment may be obtained.

U.S. Pat. No. 4,965,962 discloses a hydroponic culture system comprising angle panels having holes for supporting plants with roots projecting through the holes, and a hydroponic solution spraying mechanism. A plant cultivation structure made from angle panels in rows, the top edges of adjacent angle panel rows connected with canopies to form substantially triangular-sectioned spaces between the adjacent angle panel rows.

U.S. Pat. No. 5,557,885 discloses a hydroponic planter having a tank storing the mixture of water and nutrients and a sight glass for gauging the proper water level range. Compressed air is used to draw water into the bottom of the tube and lift it to the top of the tube where it is discharged into a planted pot. Water and nutrient solution trickles down through an inert growing medium and drains from the bottom of the pot back into the storage tank.

U.S. Pat. No. 5,168,664 discloses a hydroponic planter having an outer container and an inner liner. The liner includes a central inverted cup-shaped reservoir for a liquid nutrient solution. The outer wall of the liner includes slots extending substantially above the height of the reservoir, to provide aeration of the roots of plants growing in the planter. A liquid level indicator shows when to add nutrient solution to the planter, and indicates when too little, sufficient or too much nutrient solution has been added.

U.S. Pat. No. 4,965,962 discloses a hydroponic planter having angle panel members with holes for supporting plants with roots projecting through the holes. A hydroponic solution spraying mechanism is moveable along the longitudinal direction of the panels. The spraying system provides a uniform spraying over the entire insides of the panels and not concentrated in the plant rooting areas.

U.S. Pat. No. 4,753,036 discloses a hydroponic planter having an upper surface with an opening for a plant, and a side surface having a opening to pass the rootstock of the plant. Each of the planters receives predetermined amounts of water and porosity grain fillers, such as foaming brick stones, and plants are set throughout or in part of the planters.

U.S. Pat. No. 4,704,818 discloses a hydroponic planter having frustoconical shell-like members with openings in the walls through which plants grow. A matrix of water permeable material is provided throughout each shell like member into which the plants are inserted. Liquid nutrient is introduced near the top of the rooting matrix so that with this design, nutrient is spread throughout the matrix and not concentrated in the plant rooting areas.

U.S. Pat. No. 4,419,842 discloses a hydroponic planter having a closed lower chamber for receiving a liquid nutrient solution and a top open-ended upper chamber for receiving filler material and the desired plant. A nutrient supply pipe extends downwardly into the lower chamber so that nutrient solution may be fed in a continuous cycle from the lower chamber to the upper chamber and back again.

Some of the above described operations generally use large amounts of floor space per single plant, thereby requiring expensive efforts to provide a large controlled environment free of pesticides, herbicides, etc., suitable for use in a commercial hydroponic growing operation. To minimize over- and under-watering, various gauges and carefully controlled watering or spraying devices have been developed. These systems fail to concentrate the nutrient supply in the plant rooting area and generally provide a nutrient supply in a uniform pattern over an entire plant growing area, creating either waste or the need to re-cycle an inordinate amount of nutrient.

In view of the foregoing, it is therefore believed to be advantageous to provide a hydroponic growing station having a simple nutrient delivery system having a concentrated nutrient delivery system in a compact design allowing for a cost-effective enclosed plant growing environment. An important improvement over the art provides nutrient only near plant roots thereby optimizing growing efficiencies, so that herbs, in particular, may be delivered to consumers without excessive costs. A further need within the industry is the ability to provide an optimum amount of growing illumination for different plant species, without the wastes of overlapping or non-illuminated areas.

SUMMARY OF THE INVENTION

The present invention provides a hydroponic plant growth station having angled growing boards mounted closely in parallel proximity to a channeled nutrient delivery panel. The growing boards have holes through which plants grow with the root systems contained within channels in the nutrient delivery panel. The channels are adapted to supply nutrient only to areas in close proximity to the plant roots. Plant roots are allowed to grow into a fibrous bundle and nutrients are supplied to plant roots intermittently by means of the channels so that the roots are saturated with nutrient for timed intervals and then allowed to dry for timed intervals. Arc-shaped reflector lighting hoods are suspended between rows of angled growing boards to provide uniform light distribution over a large plant area without gaps or overlaps between growing boards. Because of the compactness of the plant growth station, a plurality of stations may be sealed in a sheltered environment eliminating the need for pesticides and herbicides so that plants may be cost-effectively produced free from the unwanted effects of non-organic treatments.

BRIEF DESCRIPTION OF THE DRAWINGS

The present hydroponic growing station may be more fully understood from the following detailed description taken in connection with the accompanying drawings wherein.

DESCRIPTION OF THE PREFERRED EMBODIMENTS

Figure 1:
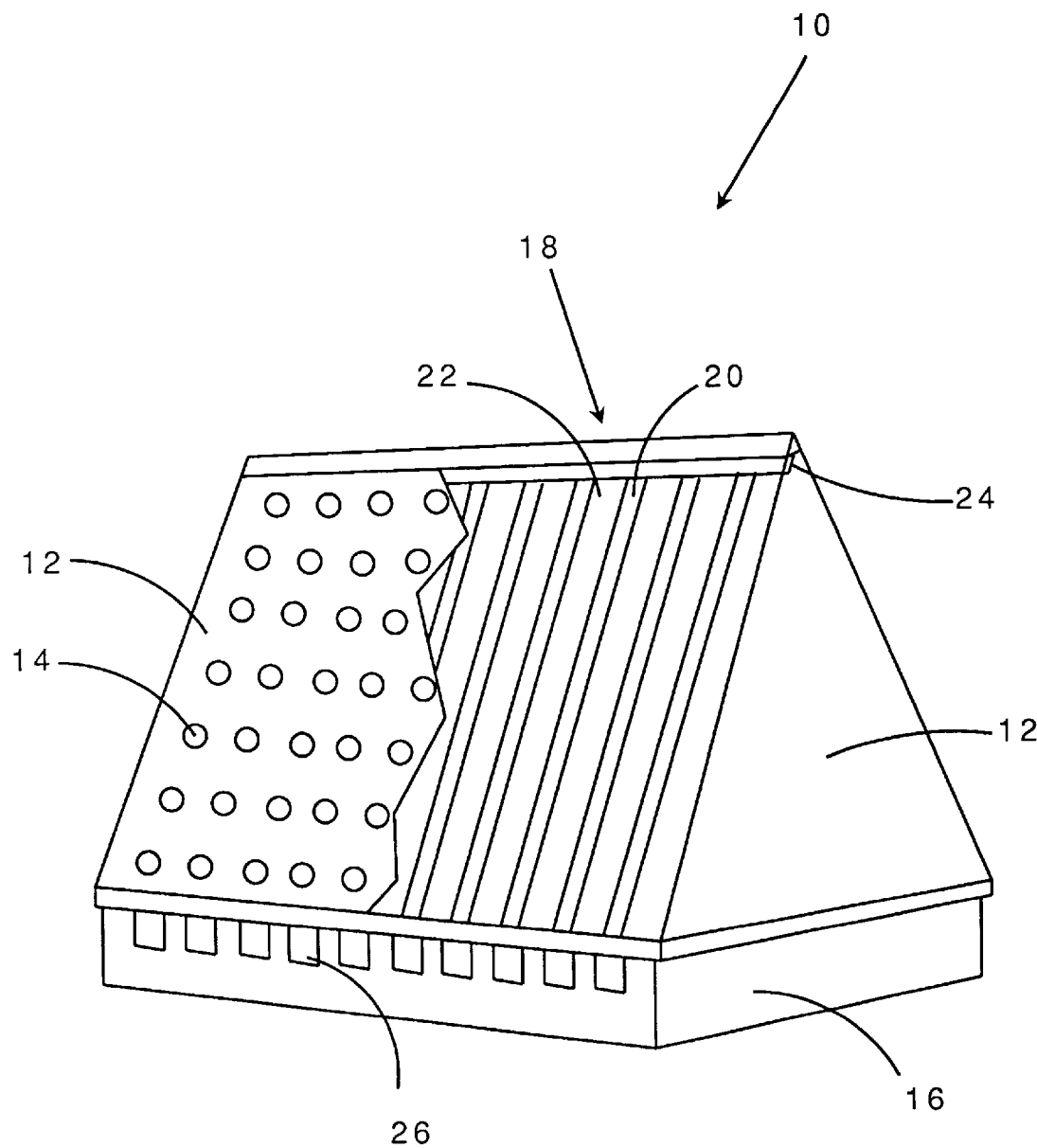
FIG. 1 is a schematic perspective view of the hydroponic growing system of the present invention.

Exemplary embodiments of the lighting system according to the present invention are presented only with those components of primary interest relative to the inventive apparatus and process. For purposes of clarity, many of the mechanical and electrical elements for attaching and assembling the various components of the hydroponic growing system are not illustrated in the drawings. A time-controlled power supply which controls a nutrient delivery pump and provides for the delivery of liquid nutrients used in the present growing system is not shown as such power supplies and their operation are well known within the industry. A lighting control panel which provides for the electrical control of a illumination system used in the present lighting system is also not shown as such bulbs and their operation are well known within the industry. These omitted elements may take on any of a number of known forms which may be readily realized by one of normal skill in the art having knowledge of the information concerning the mode of operation of the system and of the various components and related processes utilized for a hydroponic growing system as provided herein.

As used herein, the term "hydroponic" refers to a plant growth system in which plant roots are suspended in a liquid nutrient including water and the term "aeroponic" refers to a plant growth system in which plant roots are suspended in air and are constantly exposed to a nutrient-rich mist. The term "organic nutrient" refers to a organic substance having nutritional value to a plant. The terms "lighting", "radiation" and "illumination" all refer to electromagnetic energy having a wavelength in the infrared, visible and ultraviolet range. The term "triangular" refers to any form of a triangular or rectangular shaped element having a parallelogram shaped base. The term "growing environment" refers to the totality of environmental conditions surrounding growing plants, including illumination, temperature, carbon dioxide concentration, pesticides, herbicides, etc.

Figure 2:
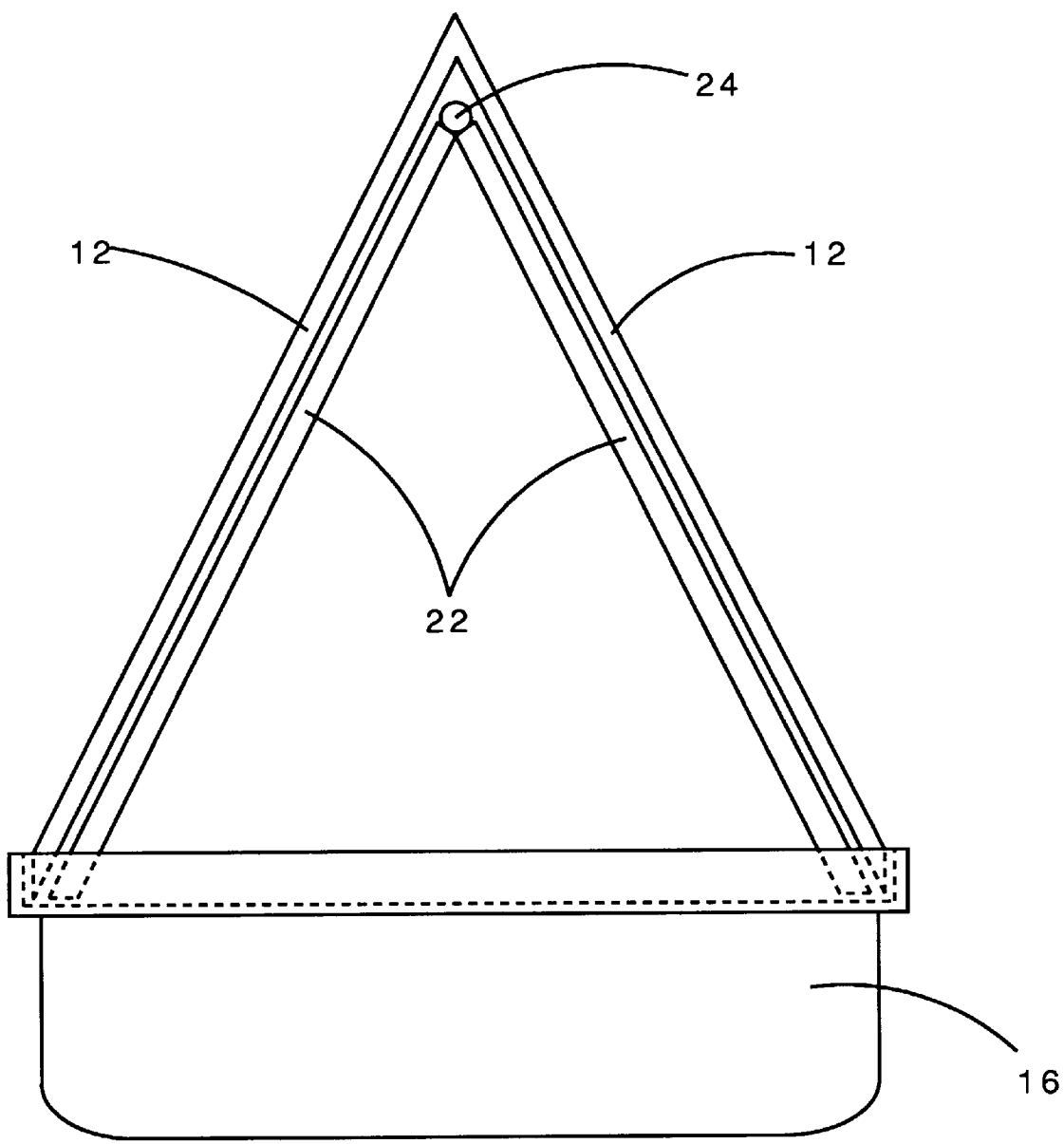
FIG. 2 is a side view showing the hydroponic growing system of FIG. 1.

Referring to the drawings, FIG. 1 illustrates a hydroponic growing station 10 of the present invention comprising a pair of angled growing boards 12 having a uniform distribution of horizontal rows and vertical columns of openings 14 in the angled growing boards 12 through which plants can grow. The growing boards 12 are removably supported with their lowermost portions supported on a base 16 and inclined together at the uppermost portions to form a hollow triangular-like structure, preferably having a generally A-frame shape over the base 16 (see FIG. 2) although other shapes like a rectangular box may be used to practice the present invention. Base 16 is a open topped tray-like container having a lip formed along the upper edges to support growing boards 12 and a liquid nutrient delivery panel 18. A nutrient delivery system 18 functions as a watering stream and is disposed beneath each of the angled growing boards 12 to be coextensive with and in substantially close parallel proximity therewith so that roots of plants inserted through the openings 14 may engage nutrients supplied within channels 20 of nutrient delivery system 18. In an exemplary embodiment, the openings 14 in the angled growing boards 12 may be arranged in a number of vertical columns spaced a distance about 3 to 4 inches apart with the openings 14 within each column also spaced a distance about 3 to 4 inches apart.

Nutrient delivery system 18 comprises a number of vertically oriented watering channels 20 formed in a panel 22 and spaced apart the same distance as the vertical columns of openings 14. Each one of the vertical columns of openings 14 is positioned in alignment with a single one of the vertically oriented watering channels 20. In an exemplary embodiment, panel 22 may be formed of polystyrene having a thickness between about ½ and 1 inch and channels 20 may have dimensions of about ¼×1 inch. This channeled nutrient supply panel 22 provides a means to concentrate nutrient supply near the plant rooting areas and eliminates wastes inherent in hydroponic planting designs having contiguous rooting matrices. In a preferred embodiment, growing boards 12 are formed of one-half inch thick polystyrene with height about four feet and length about eight feet and having an about 4-inch spacing between 11 rows and 23 columns of openings 14. In this embodiment, base 16 is about 3-feet wide by 8-feet so that the growing boards 12 are at an angle of about 22 degrees from vertical. Because there are a pair of growing boards 12 within each growing station 10, a total of 506 plants may be grown in a floor space of about 24 square feet. Such a plant density is conducive to maintaining a controlled environment within an enclose area without excessive expenses.

Figure 3:
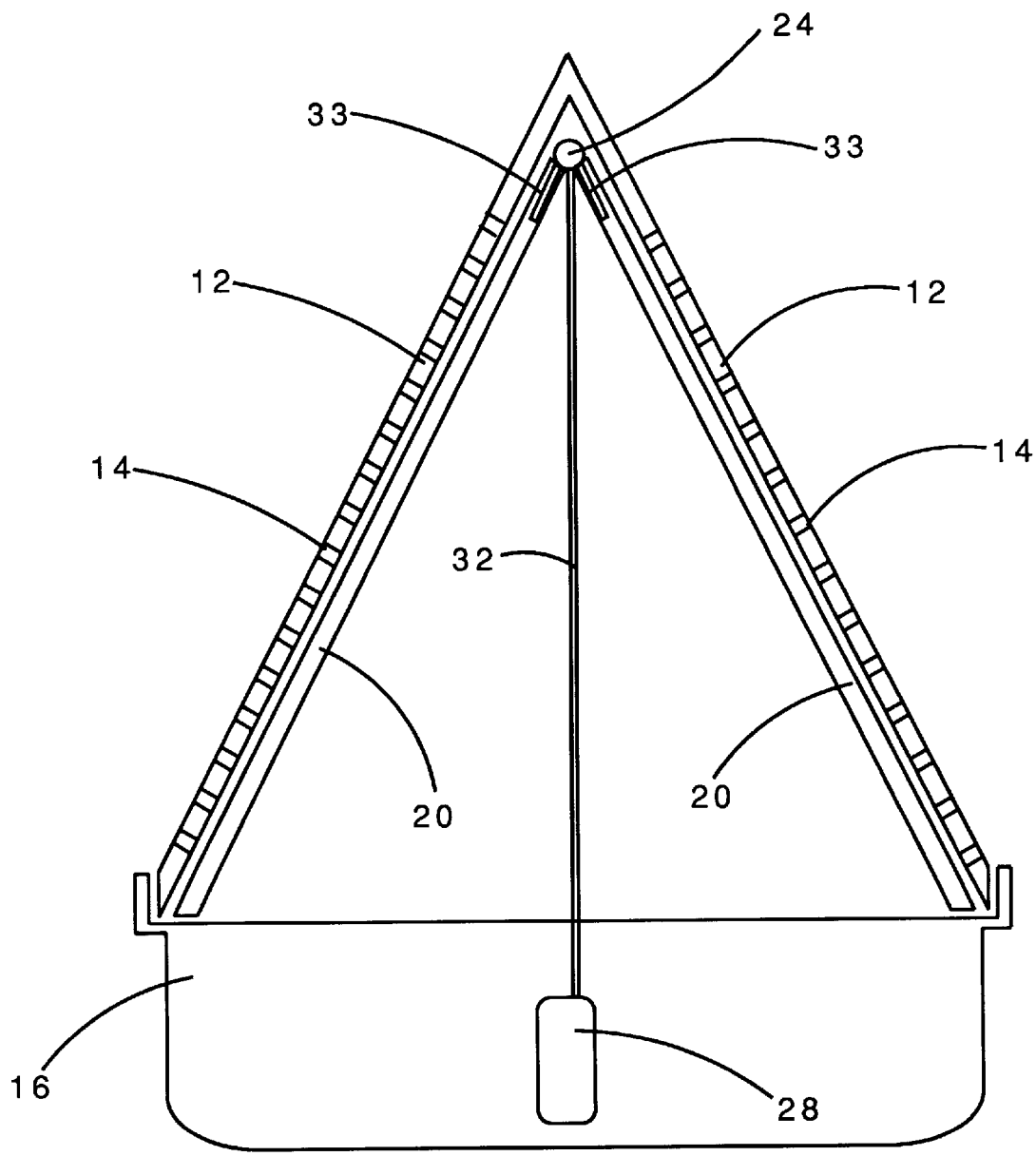
FIG. 3 is a cross sectional side view showing the nutrient delivery system of the hydroponic growing system of FIG. 1.

A nutrient delivery channel header 24 is disposed at the uppermost edges of the channeled nutrient supply panels 22 in liquid communication with each of the watering channels 20 and is adapted to supply nutrient in a timed interval pattern to the roots of those plants placed in the openings 20 and growing within the confines of the channels 20. Unconsumed nutrient is captured in a drain 26 at the lowermost end of each of the watering channels 20 and is funneled into the base 16 from where it may be drained for recycling. Channel header 24 typically comprises a closed end tube 24 having a plurality of open ports or distribution hoses 33 positioned along the length of the tube at locations corresponding to the locations of watering channels 20. The ports or distribution hoses 33 are adjusted so that nutrient pumped into the channel header 24 flows out of the header 24 and into each of the channels 20 (illustrated in FIG. 3). Nutrient flows by gravity downwards the length of the channel 20 and is absorbed by the fibrous root bundles of plants located within the vertical column of openings 20. Nutrient not absorbed by root bundles flows from the lowermost end of each of the channels 20 and is collected within the base 16. As seen in FIG. 3, pump 28 is located within the base 16 and is plumbed by primary hose 32 equipped with a filter (not shown) to deliver filtered unconsumed nutrient collected within the base 16 to the header 24 through primary hose 34. Pump 28 and circular bottom reflector 48 are controlled by a programmable power supply (not shown) to supply nutrient to the header 24 through primary delivery hose 32 during a first nutrient supply time interval and to withhold nutrient from the header 24 during a first dry time interval following the first nutrient supply time interval so that no nutrient is provided to the channels 20 during the dry time interval. First nutrient supply time interval and first dry time interval are repeated in sequence to provide alternating periods of first nutrient supply time and first periods of dryness to plant roots growing within channels 20. The relative amounts of time in first and second time intervals may be varied to optimize root growth for different plants.

Figure 4:
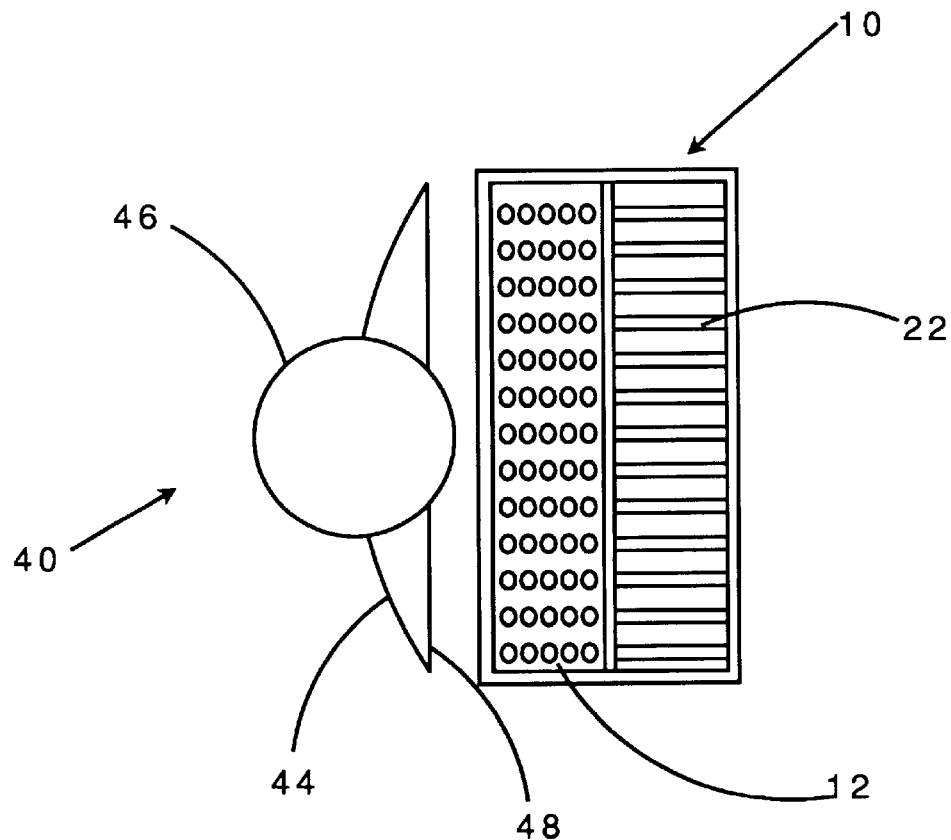
FIG. 4 is a top plan view of one of the growing boards of the hydroponic growing system of FIG. 1.
Figure 4A:
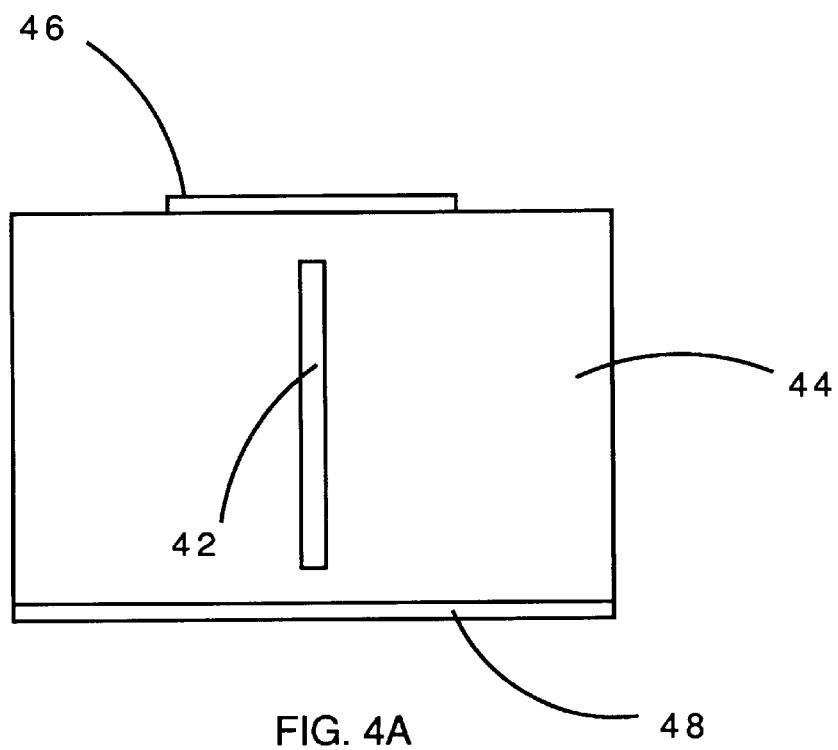
FIG. 4A is an elevational view of a light source for use with the hydroponic growing system of FIG. 1.

FIGS. 4 and 4A show at least one lighting station 40 located outwards from at least one of said growing boards 12, the lighting station 40 having a light source 42 and a back reflector 44, the back reflector 44 shaped to reflect light from the light source 42 when positioned at the focal point of the reflector 44 into a uniform light pattern incident onto the growing board 12. A circular top reflector 46 is adapted to reflect radiation towards the uppermost portion of the growing board 12. The dimensions of lighting station 40 are selected so that radiation from light source 42, preferably having a linear tubular shape, forms a pattern coextensive with growing board 12 in order to avoid energy waste and enhance the cost effectivity of plant growing. In the preferred embodiment described previously wherein growing boards 12 are about 4x8 feet and angled at about 22 degrees, the back reflector is of dimensions about 3x6 feet and a uniform pattern of radiation is achieved with a metal halide or high pressure sodium light source of about 1000 watts,.

Figure 5:
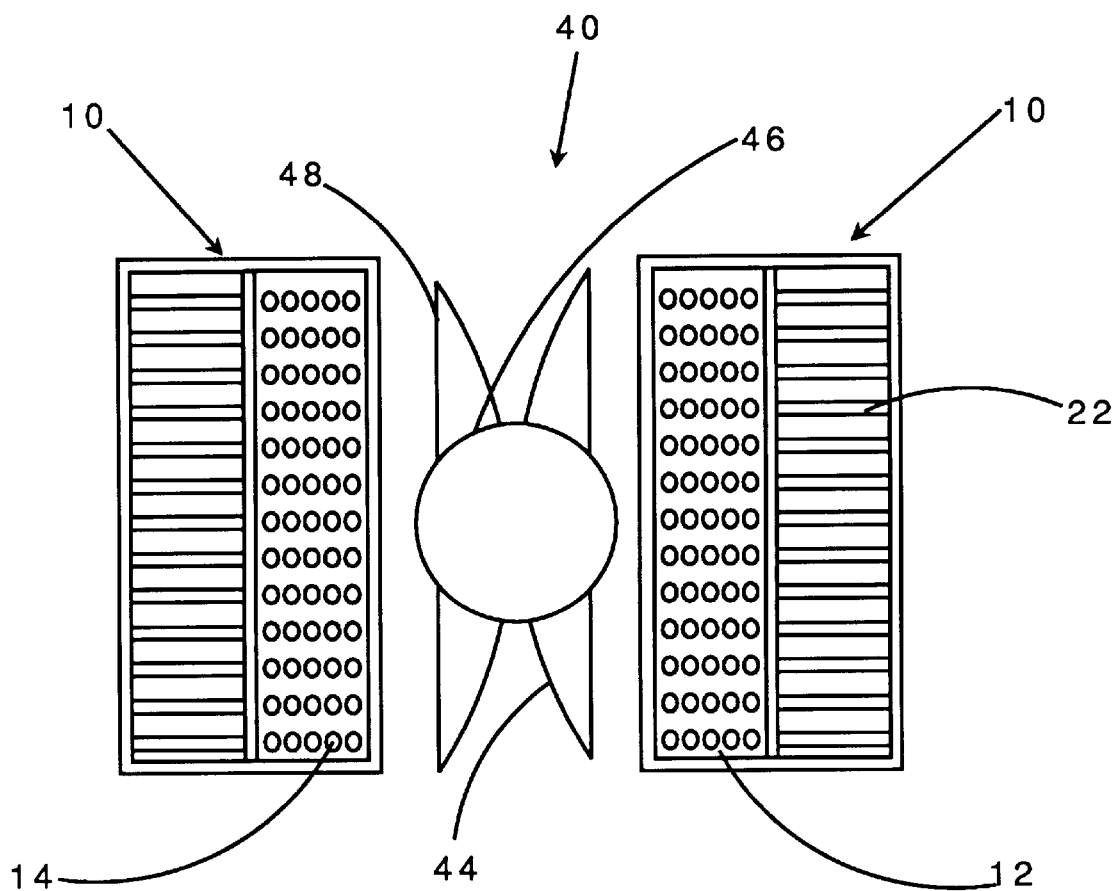
FIG. 5 is a top plan view of a hydroponic growing system having a pair of growing stations and a light source in accordance with the present invention; and, FIG. 6 is a top plan view of a hydroponic growing system having a number of growing stations interposed among reflected lighting bulbs in accordance with the present invention.
Figure 6:
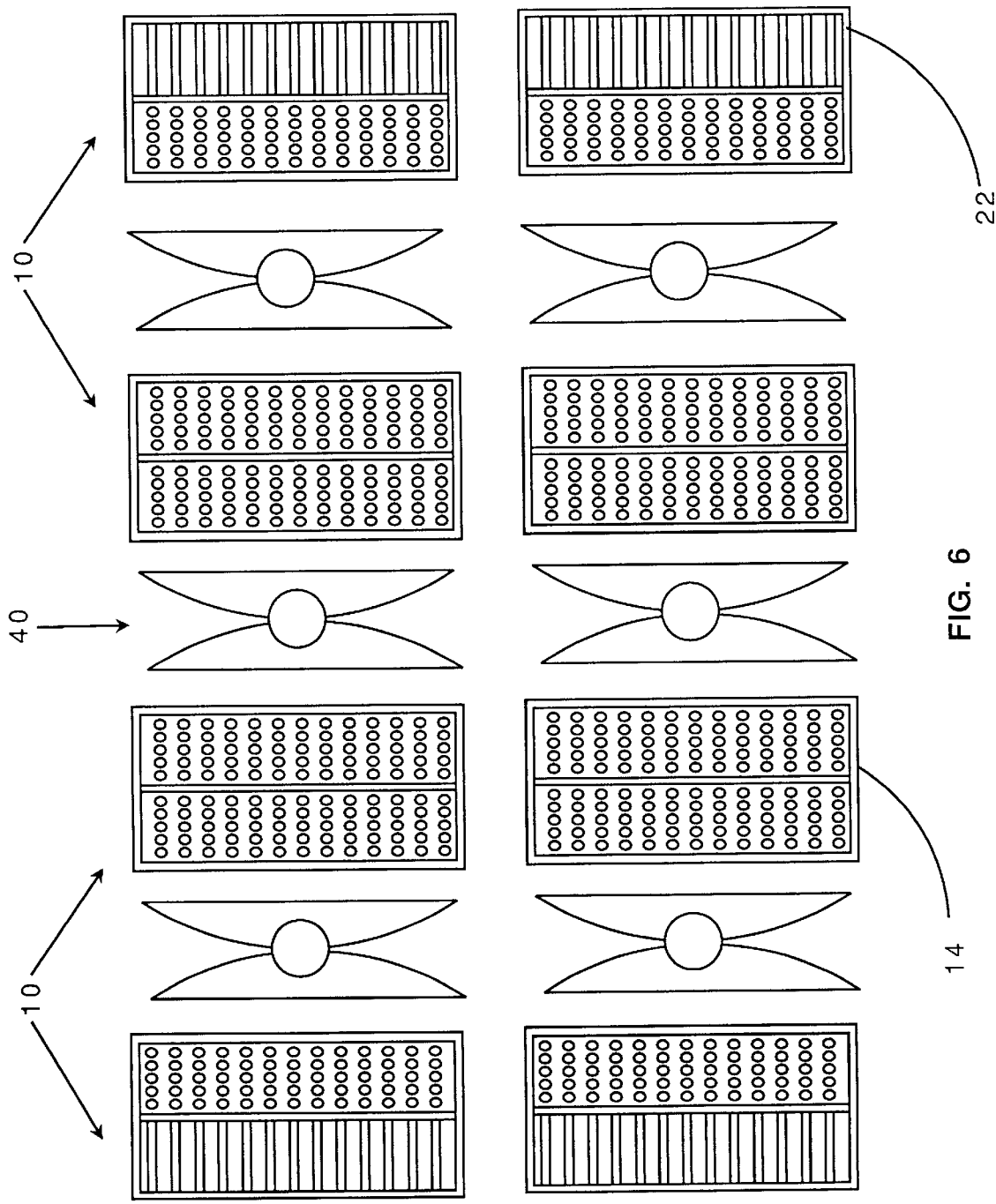

FIG. 5 is a layout diagram showing how a pair of hydroponic growing stations 10 of the present invention may be positioned on opposite sides of a illumination system 40. In this instance, the growing boards 12 located away from the illumination system 40 are removed, exposing the watering channels 20, since no radiant energy would impinge plants position therein. FIG. 6 is a layout diagram showing how a plurality of growing stations 10 and illumination systems 40 may be arranged in a pattern to achieve very high plant growing density so that plants may be grown in an controlled and enclosed environment, not having herbicides or pesticides, without incurring excessive costs. Using such a layout and with the equivalent of ten hydroponic growing stations 10 of the present invention, providing about 5,000 plant growing sites in holes 14, has been shown to produce over 2,000 pounds of organically grown, pesticide and herbicide free basil in a four to six week growing period. In this instance, a hydro-organic plant nutrient comprised essentially of a finely filtered, water-based solution of bat guanos and sea kelp was delivered to the channels 22 in first nutrient supply and first dry time intervals ranging between 30 and 90 minutes and 2 and 3 hours respectively.

While the present invention has been described with respect to what is presently considered to be exemplary embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A hydroponic plant growing station for promoting the growth of plants comprising:
   a pair of growing boards joined together to form a triangular shaped element, each of the growing boards having a plurality of open holes arranged in vertical columns of open holes and adapted for supporting plants whose roots are inserted therethrough;
   a nutrient delivery system disposed beneath each of the growing boards coextensive with and in substantially close parallel proximity therewith,
   the nutrient delivery system comprising a number of vertically oriented
   watering channels formed in a panels and spaced apart the same distance as
   said vertical columns of open holes;
   a closed end tube nutrient delivery header having a plurality of distribution hoses in liquid communication with said channels; and,
   means for supplying nutrient in a timed interval pattern to said nutrient delivery header and into said channels,
   so that nutrient may be delivered in close proximity to plant roots inserted through said open holes.

2. A method for growing plants comprising:
   joining together a pair of growing boards to form a triangular shaped element, each of the growing boards having a plurality of open holes arranged in vertical columns of open holes and adapted for supporting plants whose roots are inserted therethrough;
   disposing a nutrient delivery system beneath each of the growing boards coextensive with and in substantially close parallel proximity therewith,
   the nutrient delivery system comprising a number of vertically oriented watering channels formed in a panels and spaced apart the same distance as said vertical columns of open holes;

disposing a closed end tube nutrient delivery header having a plurality of distribution hoses in liquid communication with said channels; and, supplying nutrient in a timed interval pattern to said nutrient delivery header and into said channels, so that nutrient may be delivered in close proximity to plant roots inserted through said open holes.

3. The method for growing plants of claim 2 wherein the timed interval pattern comprises a first nutrient supply time interval followed by a first dry time interval.

4. The method for growing plants of claim 2 wherein the timed interval pattern comprises a series of first nutrient supply time intervals alternating with a series of first dry time interval.

* * * * *